3,781,337
ELIMINATING CARBON DIOXIDE FROM FORMYLOXYALKYNES

Walter Himmele, Walldorf, Werner Fliege, Otterstadt, and Helmut Froehlich, Karlsruhe, Germany, assignors to Badische Anilin- & Soda-Fabrik Aktiengesellschaft, Ludwigshafen (Rhine), Germany
No Drawing. Filed Dec. 3, 1971, Ser. No. 204,731
Int. Cl. C07c 1/20, 67/00
U.S. Cl. 260—491       12 Claims

ABSTRACT OF THE DISCLOSURE

A process for the catalytic elimination of carbon dioxide from formyloxyalkynes which bear a formyloxy group on at least one of the carbon atoms in the α-position to the triple bond. The process is important for example for the production of alkynyl formates such as 2-butyn-1-yl formate, 2-pentyn-1-yl formate and 3-hexyn-2-yl formate from the corresponding alkynediol diformate and for the production of alkynes and allenes from alkynediol diformates or alkynyl formates.

---

The invention relates to a process for the catalytic elimination of carbon dioxide from formyloxyalkynes which bear af formyloxy group on at least one of the carbon atoms in the α-position to the triple bond.

A characteristic reaction of formic esters is catalytic decarbonylation, i.e. the elimination of carbon monoxide, by means of alkaline catalysts. Decarboxylation of the other hand can only be enforced by the action of temperatures of from about 300° to 400° C. It is only formyloxy compounds which bear aryl substituents on the carbon atom bearing the formyloxy group that tend to undergo decarboxylation at temperatures below 200° C. The possible applications of the decarboxylation reactions are thus greatly restricted.

It is an object of the invention to prepare alkynol esters which bear an acyloxy group on one of the carbon atoms in the α-position to the triple bond. Another object is to prepare higher alkynes and higher allenes.

We have now found that carbon dioxide can be eliminated at temperature as low as 140° to 260° C., particularly at from 160° to 220° C. from formyloxyalkynes of the Formula I:

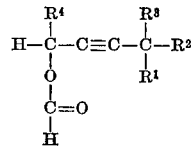

(I)

in which $R^1$ denotes hydrogen, alkyl of one to six carbon atoms or the group

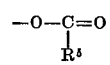

each of $R^2$ to $R^5$ denotes hydrogen or alkyl of one to six carbon atoms and, when $R^1$ denotes the group

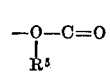

$R^2$ denotes hydrogen, by contacting the formyloxyalkyne with a finely divided metal of Group Ib and/or cadmium or zinc as metals of group IIb and/or nickel, palladium or platinum as metals of Group VIII of the Periodic Table or a compound of one of the said metals from which the free metal is formed under the reaction conditions.

This fact is particularly surprising because carbon dioxide is not eliminated under the said reaction conditions from the corresponding formyloxyalkanes or formyloxyalkenes (see also German laid-open specification No. 1,805,403).

Suitable formyloxyalkynes of the Formula I:

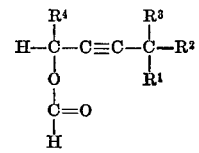

(I)

are those in which $R^1$ denotes hydrogen, alkyl of one to six carbon atoms or the group

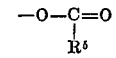

each of $R^2$ to $R^4$ denotes hydrogen or alkyl of one to six carbon atoms;
$R^5$ denotes hydrogen or alkyl of one to six and preferably one or two carbon atoms
and, when $R^1$ denotes the group

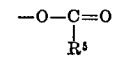

$R^2$ denotes hydrogen.

Alkynyl formates (formyloxyalkynes), alkynediol diformates (diformyloxyalkynes) or the monoformates of alkynediols whose second hydroxyl groups is esterified by another carboxylic acid, corresponding to the Formula I, may be used as starting materials depending on the type of compound desired as end product. When alkynes or a mixture of alkynes and the isomeric allenes are desired as end products, alkynyl formates or alkynediol diformates may be subjected to elimination of carbon dioxide. The diformates of alkynediols are used for the production of alkynyl formates, and the monoformates of alkynediols whose second hydroxyl groups have been esterified by other carboxylic acids are used as starting materials for the production of carboxylic esters of alkynols. Since the esterified monoformates of alkynediols can only be prepared in pure form with difficulty, mixtures of the same with alkynediol diformates may be used for the production of carboxylic esters of alkynols because the resultant mixture of esters is easy to separate by distillation.

The process has special importance for eliminating carbon dioxide from alkynediol diformates.

The following formyloxyalkynes of the Formula I are generally used:

2,7-dimethyl-4-octyne-3,6-diol diformate,
2-pentynl-1-yl formate,
5-decyne-4,7-diol diformate.
4-octyne-3,6-diol diformate,
2-hexylene-1,4-diol diformate (1,4-diformyloxy-2-hexyne),
2-heptyne-1,4-diol diformate,
5-methyl-2-hexyne-1,4-diol diformate,
2-heptyn-1-yl-formate,
2-octyne-1,4-diol diformate, and
2-octyn-1-yl formate.

2-butyn-1-yl formate (1-formyloxy-2-butyne), 2-butyne, 1,4-diol diformate (1,4-diformyloxy-2-butyne), 2-butyne-1,4-diol monoformate monoacetate, 2-pentyne-1,4-diol diformate (1,4 - diformyloxy - 2 - pentyne), 3-hexyn-2-yl formate and 3-hexyne-2,5-diol diformate are particularly suitable.

The alkynediols required for the preparation of the alkyndiol diesters of the Formula I are easily accessible for example by reaction of acetylene, propargyl alcohol or 3-alkylsubstituted 1-alkyn-3-ols with the appropriate aldehydes.

Alkynyl formates of the Formula I in which $R^2$ denotes a hydrogen atom can be prepared by the process according to the present invention from the appropriate alkynediol diformates.

The formyloxyalkynes are contacted with finely divided metals or compounds of these metals which are wholly or partly into the free metals under the reaction conditions. The metals function as decarboxylation catalysts.

The following are suitable according to the invention as catalysts: The metals of Group I$b$ of the Periodic Table, i.e. copper, silver and gold; of the metals of Group II$b$ of the Periodic Table, cadmium and zinc, mixtures of these metals or their alloys such as bronze or brass, and compounds of these metals which are capable of forming the corresponding metals under the reaction conditions. Furthermore of the metals of Group VIII of the Periodic Table, nickel, palladium and platinum, particularly nickel and palladium or their compounds coming under the above definition, may be used as decarboxylation catalysts. The metals are used in finely divided form, as metal powder to granulated metal, or finely distributed on a carrier such as pumice, silica gel, activated carbon or aluminum oxide.

Oxides, carbonates, acetates and formates are particularly suitable compounds of the said metals for use according to the invention.

The preferred catalysts are however metals of Group I$b$ of the Periodic Table, particularly copper and copper alloys and the compounds of copper which satisfy the above definition. The following are particularly favorable as catalysts: copper powder, copper chips, granulated copper, cupric oxide, copper carbonate, cupric acetate, cupric formate and copper chromite, and also bronze or brass in the form of powder, chips or granules. Copper acetylacetonate, for example, is not suitable as a catalyst for the purposes of this invention because under the reaction conditions it is not converted into metallic copper or is converted only to an insignificant extent.

Elimination of carbon dioxide in accordance with the invention may be carried out in the gas phase, for example by passing the formyloxyalkyne of Formula I alone or diluted with an inert gas such as nitrogen over a fixed-bed catalyst at the reaction temperature.

It is however particularly advantageous to carry out the process in the liquid phase, the formyloxyalkynes of Formula I in pure form or dissolved or suspended in solvents being heated to the reaction temperature together with the catalyst.

The reaction temperature is generally within the range from 140° C. to 260° C., preferably from 160° to 220° C. In special cases lower temperatures, i.e. temperatures down to about 100° C., or higher temperatures up to about 280° C. may be used.

The reaction period depends on the way in which the reaction is carried out, on the reaction temperature and on the catalyst. It is generally from 1 minute to 10 hours.

When the reaction is carried out in the gas phase, somewhat higher temperatures are generally used, for example up to 280° C., and shorter reaction periods, for example from 30 seconds to 3 minutes.

When the reaction is carried out in the liquid phase, reaction periods of from about 1 to 10, preferably from 2 to 6, hours are necessary for the production of alkynes and allenes, and generally reaction periods of from a few minutes to 3 hours for the production of alkynyl esters as the main product. When the process is carried out in special ways, as for example by dripping the formyloxyalkyne (I) in to a suspension of the catalyst in a high boiling solvent heated to the reaction temperature while at the same time distilling off the decarboxylation product, the residence time of the formyloxyalkyne in contact with the catalyst may be only a few seconds.

Elimination of carbon dioxide may be carried out at atmospheric pressure, at pressures of up to 200 atmospheres or at subatmospheric pressures. The reaction may be carried out batchwise or continuously.

In principle any solvent which does not react with the starting materials or the catalyst under the reaction conditions may be used. The following are examples: benzene, diethylbenzene, diisopropylbenzene, diphenylmethane, diphenyl, diphenyl oxide, ethers of ethylene glycol, diethylene glycol or triethylene glycol with alcohols of up to 4 carbon atoms, and also triaryldimethanes and other special aromatic mineral oils or mixtures thereof.

Diphenylmethane and high boiling aromatic oils such as Marlotherm which boils at 390° C. and consists of a mixture of isomeric triaryldimethanes (a product of Chemische Werke Hüls AG, of Marl, Germany), the aromatic mineral oil of Mobil Oil AG of Germany known as Mobiltherm 600, or Diphyl (a heat transfer agent consisting of 27% of diphenyl and 73% of diphenyl oxide) are particularly suitable.

The reaction products formed from formyloxyalkynes of Formula I in the elimination of carbon dioxide according to the invention are worked up by conventional methods, for example by distillation with previous condensation if necessary.

The process of the invention may be carried out in various ways depending on the type of starting material and the desired main product.

When an alkynediol diformate of Formula II:

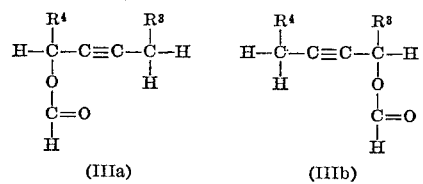

is used as starting material, an alkynyl formate is primarily formed by elimination of 1 mole of $CO_2$ per mole of diformate, and this can split off further carbon dioxide with the formation of the corresponding alkyne or a mixture of alkyne and isomeric allene. There are generally formed alkynyl esters of Formula IIIa and/or IIIb:

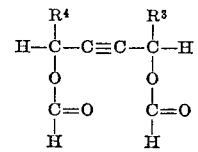

(IIIa)    (IIIb)

and alkynes of Formula IV:

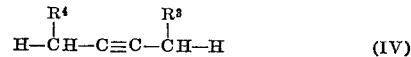

or alkynyl esters of Formulae IIIa and IIIb, alkynes of Formula IV and isomeric allenes of Formulae Va and Vb:

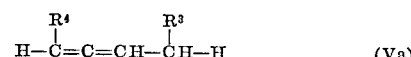

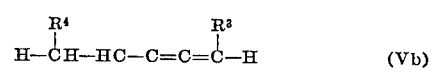

together. When substituent $R^4$ in the alkynediol diformate is the same as substituent $R^3$, isomeric mixtures of alkynyl esters and allenes are naturally not obtained. When only one of the substituents $R^4$ and $R^3$ of the alkynediol diformate (II) is alkyl, that formyloxy group is preferentially removed by elimination of carbon dioxide which is attached to the carbon atom bearing the alkyl group.

If it is desired to prepare alkynyl formates as the main product from the corresponding alkynediol diformates of Formula II, provision has to be made by using suitable reaction conditions that the major proportion of the alkynyl formate formed cannot react further with elimination of carbon dioxide. This may be achieved by stopping the reaction while it is incomplete, for example by lowering the temperature and isolating the alkynyl formate from the reaction mixture by a conventional method, preferably by distillation.

It is favorable to stop the reaction when the amount of carbon dioxide which has been eliminated amounts to about 40 to 80% of the total carbon dioxide which it is possible to eliminate. It is particularly recommended that in this variant of the process the elimination of carbon dioxide should be carred out in the presence of a solvent.

In many cases the elimination of carbon dioxide from alkynediol diformates of Formula (II) according to the invention can be carried out so that alkynyl formates are formed as the main product, by carrying out the reaction in the liquid phase and immediately removing the decarboxylation products formed from the reaction mixture by distillation. This variant of the process is particularly suitable for the continuous production of alkynyl formates. This variant of the process has proved to be particularly suitable for the production of 2-butyn-1-yl formate from 2-butyne-1,4-diol diformate, because 2-butyn-1-yl formate with a boiling point of 138° to 140° C. is easily separable under the reaction conditions from 2-butyne-1,4-diol diformate which does not boil until 238° C. By transesterification with methanol in the presence of an acid catalyst, it is easy to obtain from 2-butyn-1-yl formate (in addition to methyl formate) 2-butyn-1-ol which is of great industrial importance and which is very difficult to obtain by conventional methods. The homologous alkynols having hydroxyl groups in the $\alpha$-position to the triple bond can be prepared analogously.

The alkynyl formates having a boiling point above 200° C. are preferably distilled off at subatmospheric pressure.

For the production of alkynyl esters having Formula VI:

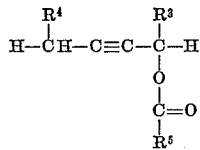

in which $R^3$ and $R^4$ denote hydrogen or alkyl of 1 to 6, preferably 1 to 4, carbon atoms and $R^5$ denotes alkyl of 1 to 6, preferably 1 or 2, carbon atoms, the starting material is the corresponding formyloxyalkyne of Formula VII:

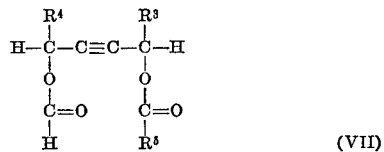

in which $R^3$ to $R^5$ have the meanings given for Formula VI, i.e. alkynediol monoformic acid esters whose second hydroxyl groups is esterified by the corresponding higher carboxylic acid. Since such alkynediol diesters can be prepared in pure form only by expensive methods, their mixtures with alkynediol diformates formed in the esterification of alkynediols with formic acid and the higher carboxylic acid are used and after the elimination of carbon dioxide the alkynol esters are separated from one another by a conventional method, for example by fractional distillation.

When the reaction is not prematurely stopped in the elimination of carbon dioxide from alkynediol diformates of Formula II, or the alkynyl formates first formed are not removed from the reaction mixture, mixture of alkynes of Formula IV and allenes of Formulae Va and Vb are generally formed by elimination of a second mole of carbon dioxide.

The relative proportions of the alkynes and allenes formed depends on the type of substituents $R^3$ and $R^4$.

When a formyloxyalkyne of Formula I in which $R^1$ denotes hydrogen or the group

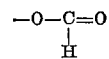

and $R^2$ and $R^4$ denote hydrogen is reacted according to the invention, the main product formed is 2-butyne which contains only small amounts of 1,2-butadiene.

On the other hand when a formyloxyalkyne of Formula I is used in which $R^3$ and $R^4$ denote methyl, $R^2$ denotes hydrogen and $R^1$ is hydrogen or the group

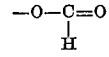

the main product formed is hexadiene-(2,3) which contains only a small amount of 3-hexyne.

A more or less large proportion of the alkyne compounds form tarry byproducts during heating depending on the reaction conditions. The amount of these tarry byproducts can be decreased however by carrying out the reaction in the presence of a solvent.

Since alkynediols and alkynols decompose in an alkaline medium with the reformation of acetylenes and aldehydes, and the starting compounds having the Formula I may contain small amounts of unesterified alkynediol or alkynol, a small amount of formic acid or a difficultly volatile carboxylic acid, particularly a dicarboxylic acid, is as a rule added to the reaction mixture when working in the liquid phase. Suitable acids include 2-ethylhexanoic acid, palmitic acid, stearic acid, suberic acid, and preferably adipic acid and pimelic acid. These acids may be added to the reaction mixture advantageously in amounts of from 0.05 to 2% by weight, preferably from 0.1 to 0.5% by weight based on formyloxyalkyne.

Alkynyl esters of Formulae IIIa, IIIb and VI and hydrocarbons having a C—C triple bond such as 2-butyne, or hydrocarbons having two adjacent C—C double bonds such as 2,3-hexadiene, which hitherto could only be prepared by expensive methods, can be obtained in a fairly simple way by means of the process of the invention from easily accessible starting materials.

Compounds prepared according to the invention and the alkynols which can be prepared from the alkynyl esters easily and with practically quantitative yields are valuable intermediates for organic syntheses. For example 2-butyn-1-ol (which can easily be prepared from 2-butyn-1-yl formate) is a valuable intermediate for the production of 2-butyn-1-al and tetrolic acid and also for the production of insecticides, particularly acaricides (see for example German laid-open specifications Nos. 1,962,408 and 1,950,991 or Swiss Pat. 475,708). 2-butyn-1-ol may also be used as a corrosion inhibitor according to German Pat. 1,055,492. 2-butyne which can be prepared according to the invention is a starting material for the production of trimethylhydroquinone which is an intermediate in the manufacture of vitamin E. Alkynyl esters of higher fatty acids may be used as plant growth regulators (see Netherlands Pat. 6814402).

The following examples are intended to illustrate the process according to the invention without limiting it.

EXAMPLE 1

A mixture of 1000 g. of diphenylmethane, 800 g. of 2-butyne-1,4-diol diformate (boiling point 238° C.), 10 g. of cupric oxide and 15 g. of adipic acid are heated at 190° C. for three hours in a 3-liter stirred autoclave. Gas chromatographic analysis of the gas and liquid phases of the reaction mixture indicates a conversion of 74% with the formation of 54% of 2-butyn-1-yl formate and 30% of 2-butyne based on starting material reacted.

EXAMPLE 2

50 g. of 3-hexyne-2,5-diol diformate (boiling point at 0.5 mm.; 68° C.) is heated with 0.5 g. of cupric oxide in a flask at 220° C. and the decarboxylation products (3-hexyn-2-yl formate and 3-hexyne) mixed with 2,3-hexadiene and unreacted starting material are distilled off over about two hours at atmospheric pressure while passing nitrogen through. The reaction takes place with a conversion of 87%. The distillate is fractionated. 3-hexyn-2-yl formate (boiling point at 110 mm.: 113° C.) is obtained in a yield of 11% and a mixture of 3-hexyne and 2,3-hexadiene (boiling point 81° C.) in a yield of 32% of theory, based on 3-hexyne-2,5-diol diformate reacted.

EXAMPLE 3

A mixture containing 25% of 2-butyne-1,4-diol diformate vapor and 75% of nitrogen is passed at a pressure of 550 mm. over a catalyst (5% of cupric oxide on 3-5 mm. pumice chips) heated to 280° C. and contained in a quartz tube having a length of 280° C. The contact time is about ninety seconds. The vapor leaving the reaction chamber is condensed and fractionally distilled. At a conversion of 68.5%, a yield of 36.5% of 2-butyne (boiling point 28° C.) and 4% of 2-butyn-1-yl formate (boiling point 138° C. to 140° C.), based on starting material reacted, is obtained.

EXAMPLE 4

A mixture of 23.8 g. of 2-butyne-1,4-diol-1-formate-4-acetate, 25.6 g. of butyne-1,4-diol diformate and 0.5 g. of cupric oxide is heated to 250° to 265° C. By allowing the liquids of lower boiling point formed in the decarboxylation reaction to distil off from the reaction mixture, 23.5 g. of a mixture of 2-butyn-1-yl acetate, 2-butyn-1-yl formate and the unreacted starting materials is obtained over about three hours. The yields are determined by gas chromatographic analysis of the mixture.

At a conversion of 88%, the yield of 2-butyn-1-yl acetate is 37% based on 2-butyne-1,4-diol-1-formate-4-acetate reacted.

At a conversion of 86%, the yield of 2-butyn-1-yl formate (boiling point 138° to 140° C.) is 70% based on 2-butyne-1,4-diol diformate reacted.

EXAMPLE 5

A mixture of 50 g. of 2-pentyne-1,4-diol diformate (boiling point at 0.4 mm: 73° C.) and 0.5 g. of cupric oxide is heated to about 220° C. By allowing the products formed in the decarboxylation reaction which occurs to distil over with a small amount of starting material while passing nitrogen through, 14.1 g. of a distillate is obtained over about three hours. The reaction proceeds with a conversion of 81%. The yield of 2-pentyn-1-yl formate (boiling point at 30 mm.: 69° C.) is 14% based on starting material reacted.

EXAMPLE 6

A mixture of 100 g. of 2-butyne-1,4-diol diformate, 1.0 g. of cupric oxide, 0.1 g. of adipic acid and 25 g. of diphenylmethane is heated to about 250° C. in a flask and liquid boiling at from 140° to 190° C. is continuously distilled off in a weak stream of nitrogen. Over about three hours a distillate is obtained from which 36.2 g. of 2-butyn-1-yl formate (boiling point 138° to 140° C.) and 21.2 g. of starting material can be isolated. At a conversion of 79%, the yield of 2-butyl-1-yl formate is 67% based on the 2-butyne-1,4-diol diformate reacted.

EXAMPLE 7

50 g. of 2-butyne-1,4-diol diformate is dripped under nitrogen over three hours into a round flask preheated to 250° C. which contains 0.5 g. of copper powder and 0.1 g. of adipic acid and the 2-butyn-1 formate formed is distilled off together with unreacted starting material. 4.6 g. of 2-butyn-1-yl formate and 14.7 g. of 2-butyne-1,4-diol diformate may be recovered by fractionation at subatmospheric pressure. The reaction thus proceeds with a conversion of 70.6%. The yield of 2-butyn-1-yl formate is 19% based on starting material reacted. 2-butyne is not obtained under these reaction conditions.

EXAMPLE 8

A mixture of 22 g. of 2-butyne-1,4-diol diformate, 0.1 g. of adipic acid and 1 kg. of cupric oxide in 100 g. of benzene is heated for six hours at 220° C. in a 250 ml. shaking autoclave. Elimination of carbon dioxide causes a rise in pressure to 65 atmospheres gauge. The reaction product is distilled. 21.2 g. of an about 20% solution of 2-butyne in benzene is obtained. 2.3 g. of 2-butyne-1,4-diol diformate remains in the residue. The reaction thus proceeds with a conversion of about 90%. The yield of 2-butyne (boiling point 28° C.) is 57% based on starting material reacted.

EXAMPLE 9

A mixture of 100 g. of 3-hexyne-2,5-diol diformate, 0.5 g. of cupric oxide and 0.1 g. of adipic acid is heated for six hours at 200° C. in a 0.25-1, agitated autoclave in an aromatic oil (Marlotherm S) having a boiling point of 390° C. the pressure rises to 40 atmospheres gauge by the elimination of carbon dioxide. Fractional distillation of the reaction solution obtained gives 15 g. of a mixture of isomers consisting substantially of 2,3-hexadiene and a little 3-hexyne which has the boiling point 81° to 85° C.; 13 g. of 3-hexyn-2-yl formate (boiling point at 110 mm.: 113° C.) and 27 g. of 3-hexyne-2,5-diol diformate (boiling point at 110 mm.: 153° to 158° C.).

The conversion is 73%, the yield of 3-hexyn-2-yl formate is 24% and the yield of 2,3-hexadiene which contains a small amount of 3-hexyne is 43% of theory based on 3-hexyne-2,5-diol diformate reacted.

EXAMPLE 10

A mixture of 21.4 kg. of 2-butyne-1,4-diol diformate, 22.5 kg. of high boiling aromatic oil (Marlotherm S), 110 g. of copper powder and 110 g. of adipic acid is heated at temperatures of from 195° to 200° C. under a nitrogen pressure of 10 atmospheres gauge in a 80-1, stirred autoclave. After a reaction period of eighty minutes, a pressure of 115 atmospheres gauge has been set up. After the autoclave has been cooled to room temperature it is expanded and the resultant mixture is distilled in a column. 0.44 kg. of 2-butyne, 7.3 kg. of 2-butyn-1-yl formate and 3.8 kg. of unreacted 2-butyne-1,4-diol diformate are obtained. The reaction proceeds with a conversion of 82%. The yield of 2-butyne is 7% and that of 2-butyn-1-yl formate is 60% of theory based on 2-butyne-1,4-diol diformate reacted.

EXAMPLE 11

A suspension of 15 g. of cupric oxide in 300 g. of high boiling aromatic oil (Marlotherm S) is heated to a temperature of from 205° to 210° C. in a round flask having a capacity of 1 liter and 965 g. of 2-butyne-1,4-diol diformate is dripped in over five hours while stirring. During the dripping in, 588 g. of a mixture of 2-butyne, 2-butyn-1-yl formate, 2-butyne-1,4-diol diformate and small amounts of byproducts are distilled off. The distillate obtained is fractionally distilled; 25 g. of 2-butyne (boiling point 25° to 28° C.), 319 g. of 2-butyn-1-yl formate (boiling point at 100 mm.: 80° to 81° C.) and 173 g. of unreacted 2-butyne-1,4-diol diformate boiling point at 0.1 mm.: 80° to 85° C.) are obtained.

The reaction thus proceeds with a conversion of 82%. The yield of 2-butyne is 8% and that of 2-butyn-1-yl formate is 58% of theory based on 2-butyne-1,4-diol diformate reacted.

EXAMPLE 12

A mixture of an aromatic oil boiling at 390° C. (Marlotherm S), 50 g. of 2-butyn-1-yl formate, 5 g. of copper powder and 3 g. of adipic acid is heated to 180° C.

in an autoclave having a capacity of 250 ccm. A pressure of 48 atmospheres gauge has been set up after six hours. After the autoclave has been cooled to room temperature, it is expanded and the product is distilled at atmospheric pressure. 17 g. of a distillate is obtained which according to gas chromatographic analysis contains 82% by weight (13.9 g.) of 2-butyne. At 100% conversion of the 2-butyn-1-yl formate, 13.9 g. of 2-butyne is equivalent to a yield of 50% of theory.

EXAMPLE 13

A suspension of 6 g. of colloidal silver in 150 g. of an aromatic oil boiling at 390° C. (Marlotherm S) is heated to 205° C. in a round flask having a capacity of 500 ccm. and while stirring 477 g. of 2-butyn-1,4-diol diformate is dripped in over six hours and the products formed are distilled off. 57 g. of 2-butyne, 10 g. of 2-butyn-1-yl formate and 103 g. of 2-butyne-1,4-diol diformate are obtained by fractional distillation.

The reaction proceeds with a conversion of 78%. The yield of 2-butyne is 40% and that of 2-butyn-1-yl formate is 4% of theory based on 2-butyne-1,4-diol diformate reacted.

EXAMPLE 14

0.5 g. of each of the following metals or metal compounds is heated with 10 g. of 2-butyne-1,4-diol diformate over about sixty minutes and the temperature at which strong evolution of gas takes place is determined. This gas evolution is to be observed:

(a) at temperatures of from about 190° to 210° C. with copper powder, cupric oxide, cupric formate, cupric acetate, cupric carbonate and copper chromite;
(b) at temperatures of about 210° to 225° C. with silver oxide, auric chloride, brass powder, cadmium powder and palladium on animal charcoal (10%);
(c) at temperatures above 225° and below 238° C. (the boiling point of 2-butyne-1,4-diol diformate) with nickel powder and zinc powder.

It can be established by means of barium hydroxide solution and palladium chloride solution that the gas evolved consists mainly of carbon dioxide with only very little carbon monoxide.

We claim:

1. A process for eliminating carbon dioxide from a formyloxyalkyne wherein a formyloxyalkyne of the Formula I:

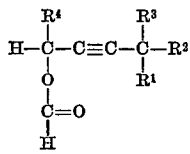

in which

R¹ denotes hydrogen, alkyl of one to six carbon atoms or the group

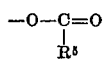

and
R² to R⁵ denote hydrogen or alkyl of one to six carbon atoms, and when R¹ denotes the group

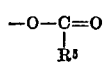

R² denotes hydrogen, is contacted at a temperature of from 140° C. to 260° C. with a catalyst selected from the group consisting of the free metals copper, silver, gold, cadmium, zinc, nickel, palladium, platinum and alloys of these metals.

2. A process as claimed in claim 1 wherein the formyloxyalkyne is contacted with finely divided copper.
3. A process as claimed in claim 1 wherein the formyloxyalkyne of Formula I is one in which R¹ denotes hydrogen or the group

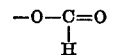

and R² to R⁴ have the meanings given in claim 1.

4. A process as claimed in claim 1 wherein the reaction is carried out in the liquid phase, the diformyloxyalkyne contacted is one having Formula II:

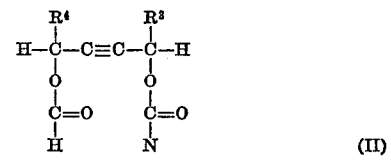

in which the radicals R³ and R⁴ have the meanings given in claim 1, and the reaction is stopped when the amount of carbon dioxide eliminated is equal to 40 to 80% of the total amount which can be eliminated.

5. A process as claimed in claim 1 wherein the reaction is carried out in the liquid phase, the diformyloxyalkyne contacted is one having Formula II:

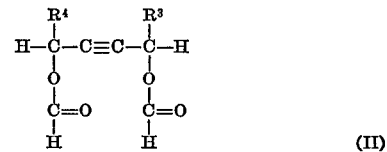

in which the radicals R³ and R⁴ have the meanings given in claim 1, and the decarboxylation product formed is immediately removed from the reaction mixture by distillation.

6. A process as claimed in claim 1 wherein the formyloxyalkyne contacted is one having Formula VI:

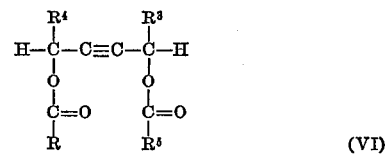

in which R³ and R⁴ have the meanings given in claim 1 and R⁵ denotes alkyl of one to six carbon atoms.

7. A process as claimed in claim 1 wherein the formyloxyalkne contacted is 2-butyn-1-yl formate.
8. A process as claimed in claim 1 wherein the formyloxyalkyne contacted is 2-butyne-1,4-diol diformate.
9. A process as claimed in claim 1 wherein the formyloxyalkyne contacted is 2-pentyne-1,3-diol diformate.
10. A process as claimed in claim 1 wherein the formyl-
11. A process as claimed in claim 1 wherein the formyloxyalkyne is contacted with an oxide, carbonate, acetate or formate of said metals from which the free metal is formed under the reaction conditions.
12. A process as claimed in claim 1 wherein the formyloxyalkyne is contacted with cupric oxide, copper carbonate, cupric acetate, cupric formate or cupric chromite which forms metallic copper under the reaction conditions.

No references cited.

VIVIAN GARNER, Primary Examiner

U.S. Cl. X.R.

260—410.9 N, 635 Y, 638 Y, 678, 681

UNITED STATES PATENT OFFICE
CERTIFICATE OF CORRECTION

Patent No. 3,781,337    Dated December 25, 1973

Inventor(s) Walter Himmele et al

It is certified that error appears in the above-identified patent and that said Letters Patent are hereby corrected as shown below:

Column 1, eighth line, insert
-- 30    Foreign Application Priority Data
    December 7, 1970    Germany . . . . P 20 60 083.3 --.

Column 1, line 26, "af" should read -- a --.

Column 1, line 30, "of" should read -- on --.

Column 1, line 44, "temperature" should read -- temperatures --.

Column 2, line 57, "2-hexylene" should read -- 2-hexyne --.

Column 5, line 11, "carred" should read -- carried --.

Column 7, line 66, "2-butyl" should read -- 2-butyn --.

Column 7, line 73, "2-butyn-1" should read -- 2-butyn-1-yl --.

Column 8, line 24, "the" should read --The --.

Column 10, line 58, "2-pentyne-1,3-diol" should read
-- 3-hexyne-1,4-diol --.

Column 10, line 59, "formyl-" should read -- formyloxyalkyne contacted is 2-pentyne-1,3-diol diformate --.

Signed and sealed this 7th day of January 1975.

(SEAL)
Attest:

McCOY M. GIBSON JR.                C. MARSHALL DANN
Attesting Officer                  Commissioner of Patents